(12) United States Patent
Bush et al.

(10) Patent No.: US 11,155,258 B2
(45) Date of Patent: Oct. 26, 2021

(54) SYSTEM AND METHOD FOR RADAR CROSS TRAFFIC TRACKING AND MANEUVER RISK ESTIMATION

(71) Applicant: GM GLOBAL TECHNOLOGY OPERATIONS LLC, Detroit, MI (US)

(72) Inventors: Lawrence A. Bush, Shelby Township, MI (US); Manpreet S. Bajwa, Windsor (CA); Shuqing Zeng, Sterling Heights, MI (US); Rickie A. Sprague, Commerce Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 244 days.

(21) Appl. No.: 16/362,889

(22) Filed: Mar. 25, 2019

(65) Prior Publication Data

US 2020/0307561 A1    Oct. 1, 2020

(51) Int. Cl.
*B60W 30/09*       (2012.01)
*B60W 30/095*      (2012.01)
(Continued)

(52) U.S. Cl.
CPC ........ *B60W 30/09* (2013.01); *B60W 30/0956* (2013.01); *G01S 13/931* (2013.01);
(Continued)

(58) Field of Classification Search
CPC ............ B60W 30/09; B60W 30/0956; B60W 2554/4045; B60W 2554/4042; B60W 2554/4041; B60W 60/0016; B60W 60/00274; G05D 1/0221; G05D 2201/0213; G05D 1/0214; G06N 20/00; G06N 7/005; G06N 3/006; G06N 20/10; G01S 13/931; G01S 13/584; G01S 13/726; G01S 13/66; G01S 13/86; G01C 21/005
See application file for complete search history.

(56) References Cited

U.S. PATENT DOCUMENTS

2002/0036584 A1*   3/2002   Jocoy ............... G01S 13/931
                                                        342/70
2003/0020634 A1*   1/2003   Banerjee ............. G08G 1/017
                                                        340/928

(Continued)

*Primary Examiner* — Nicholas K Wiltey
*Assistant Examiner* — Gabriel J Lambert
(74) *Attorney, Agent, or Firm* — Lorenz & Kopf LLP

(57) ABSTRACT

A risk maneuver assessment system and method to generate a perception of an environment of a vehicle and a behavior decision making model for the vehicle; a sensor system configured to provide the sensor input in the environment for filtering target objects; one or more modules configured to map and track target objects to make a candidate detection from multiple candidate detections of a true candidate detection as the tracked target object; apply a Markov Random Field (MRF) algorithm for recognizing a current situation of the vehicle and predict a risk of executing a planned vehicle maneuver at the true detection of the dynamically tracked target; apply mapping functions to sensed data of the environment for configuring a machine learning model of decision making behavior of the vehicle; and apply adaptive threshold to cells of an occupancy grid for representing an area of tracking of objects within the vehicle environment.

14 Claims, 8 Drawing Sheets

(51) Int. Cl.
*G05D 1/02* (2020.01)
*G06N 20/00* (2019.01)
*G01S 13/931* (2020.01)

(52) U.S. Cl.
CPC .......... *G05D 1/0221* (2013.01); *G06N 20/00* (2019.01); *G05D 2201/0213* (2013.01)

(56) References Cited

U.S. PATENT DOCUMENTS

| | | | |
|---|---|---|---|
| 2009/0306881 A1* | 12/2009 | Dolgov | G06K 9/6297 701/28 |
| 2010/0191391 A1* | 7/2010 | Zeng | G01S 13/87 701/1 |
| 2013/0002470 A1* | 1/2013 | Kambe | G01S 13/867 342/55 |
| 2014/0136045 A1* | 5/2014 | Zhu | B60W 30/08 701/23 |
| 2019/0101919 A1* | 4/2019 | Kobilarov | G05D 1/0055 |
| 2019/0113920 A1* | 4/2019 | England | G05D 1/0257 |
| 2019/0113927 A1* | 4/2019 | England | G05D 1/0231 |
| 2019/0243371 A1* | 8/2019 | Nister | G05D 1/0231 |
| 2020/0097003 A1* | 3/2020 | Wray | G06N 7/005 |

\* cited by examiner

SYSTEM AND METHOD FOR RADAR CROSS TRAFFIC TRACKING AND MANEUVER RISK ESTIMATION

TECHNICAL FIELD

The present disclosure generally relates to pre-decision maneuver risk planning, and more particularly relates to systems and methods in a vehicle for generating fuller representations of uncertainty indicators for use in pre-decision maneuver risk planning under conditions of reduced sensed information.

Vehicle perception systems have been introduced into vehicles to allow a vehicle to sense its environment and in some cases to allow the vehicle to navigate autonomously or semi-autonomously. Sensing devices that may be employed in vehicle perception systems include radar, lidar, image sensors, and others.

While recent years have seen significant advancements in vehicle perception systems, such systems still warrant improvements in a number of respects. That is, radars, particularly those used in automotive applications, can provide data with significant detection, velocity and location uncertainties. That is, the radars under conditions, may operate in instances with radar scan detections producing reduced amounts of information and return results that prevent or fail, when used as the basis for further processing steps, from achieving a needed accuracy for further required vehicle detection operations of target object tracking for maneuver planning operations.

Accordingly, it is desirable to provide improved systems, apparatus and methods for pre-decision (not yet decided) maneuver risk planning of vehicles by providing fuller representations of uncertainty indicators from results of radar scan detections (or the like) about the vehicle resulting in reduced amounts of sensed data that can result in incomplete representations of the uncertainties used to determine maneuver risk estimations in vehicle maneuvers.

Furthermore, other desirable features and characteristics of the present invention will become apparent from the subsequent detailed description and the appended claims, taken in conjunction with the accompanying drawings and the foregoing technical field and background.

SUMMARY

Systems and methods for an enhanced representation of uncertainty in radar detections for maneuver risk assessments are provided.

In one embodiment, a risk maneuver assessment system for planning maneuvers with uncertainties of a vehicle is provided. The system includes: a first controller with a processor programmed to generate a perception of an environment of the vehicle and a behavior decision making model for the vehicle including performing a calculation upon a sensor input to provide, as an output an action risk mapping and at least one target object tracking for different areas within the environment of the vehicle; a sensor system configured to provide the sensor input to the processor for providing an area in the environment of vehicle for filtering target objects; one or more modules configured to, by a processor, map and track target objects to make a candidate detection from multiple candidate detections of a true candidate detection as the tracked target object; one or more first modules configured to, by the processor, apply a Markov Random Field (MRF) algorithm for recognizing a current situation of the vehicle in the environment and predict a risk of executing a planned vehicle maneuver at the true detection of the dynamically tracked target; one or more second modules configured to, by the processor, apply mapping functions to sensed data of the environment for configuring a machine learning model of decision making behavior of the vehicle; one or more third modules configured to, by the processor, apply adaptive threshold to cells of an occupancy grid configured for representing an area of tracking of objects within the vehicle environment; and a second controller with a processor configured to generate control commands in accordance with modeling of the decision making behavior and the perception of the environment of the vehicle for planned vehicle maneuvers.

In various exemplary embodiments, the system further includes: the one or more first modules programmed to generate a Markov Random Field (MRF) to recognize the current situation. The system, further includes: the one or more of the second and/or third modules further configured to select as the true detection at least one of the candidate detections that is within a radius for the target, and a candidate detection that is closest to a first known mapped pathway. The system, further includes: the one or more of the second and/or third modules further configured to select as the true detection, the candidate that indicates a position and velocity that are consistent with a target traveling on a second known travel mapped pathway, and a selection as a false detection, the candidate that indicates a position that is outside the second known pathway or the velocity is not consistent with the target traveling.

The system, further includes: a fourth module configured to compute, by a gating operation, a distance metric from the last position of a tracked target object to a predicted position less than a threshold distance related to one or more of the candidate detections. The system, further includes: one or more fifth modules configured to, by the processor, apply the Markov Random Field (MRF) algorithm representing the tracked target object in one or more cells of an occupancy grid by: calculating an object measurement density for each tracked target object represented in the one or more cells of the occupancy grid; spreading the density over a window including the set of cells of the occupancy grid represented by the tracked target object; spreading velocities over the window including a same set of cells of the occupancy grid represented by the tracked target object.

The system, further includes: one or more sixth modules configured to, by the processor, apply mapping functions to sensed data of the environment for configuring a machine learning (ML) model of decision making behavior of the vehicle by an action risk assessment model trained using semi-supervised machine learning techniques by on-line and off-line training for mapping function to candidate actions to determine with risk factors a learned drivable path. The system, further includes: a seventh module configured to, by a processor, perform in the off-line training of the ML model including: collecting labels, co-collecting occupancy velocity grids, extracting features from the occupancy grids, and applying at least support vector machine (SVM) techniques for recognizing class patterns of the candidate actions to determine with risk factors the learned drivable path.

The system, further includes: an eighth module configured to, by the processor, apply adaptive threshold to cells of an occupancy grid configured for representing area of tracking of objects within the vehicle environment including: a ninth module configured to, by the processor, compute by an adaptive threshold occupancy density, the likelihood that a candidate action is available for the target tracked object based on the computed density distribution, and select the candidate action that has the highest probability of being available; and a tenth module configured to, by the processor, compute a clustering for velocity clusters for a set of candidate actions to select the target tracked object that indicates a position that is consistent with a learned drivable path. The ML model is trained using reinforcement learning techniques using a data set of past collected labels and sensor data of drivable paths and wherein the eight module is configured to select the candidate action that will likely contribute to one of the drivable paths wherein the sensor data at least includes one of: radar, acoustic, lidar or image sensor data.

In another exemplary embodiment, a vehicle, including: a sensor detection sensing device including one or more of a set including: a radar, acoustic, lidar and image sensing device; a risk maneuver assessment system for assessing one or more uncertainty factors in planned maneuvers; and a plurality of modules configured to, by a processor, generate a perception of an environment of the vehicle and a output target output for tracking different areas within the environment is provided. The vehicle includes: the plurality of modules including: one or more modules configured to, by a processor, map and track target objects to make a candidate detection from multiple candidate detections of a true candidate detection as the tracked target object; one or more modules configured to, by the processor, apply a Markov Random Field (MRF) algorithm for recognizing a current situation of the vehicle in the environment and for predicting a risk of executing a planned vehicle maneuver at the true detection of the dynamically tracked target; one or more modules configured to, by the processor, apply mapping functions to sensed data of the environment for configuring a machine learning model of decision making behavior of the vehicle; one or more modules configured to, by the processor, apply adaptive threshold to cells of an occupancy grid configured for representing areas of tracking of objects within the environment; and a controller with a processor configured to generate control commands in accordance with modeling of the decision making behavior and the perception of the environment of the vehicle for planned vehicle maneuvers.

In various exemplary embodiments, the one or more modules are programmed to generate a Markov Random Field (MRF) to recognize the current situation. The system, further includes: the one or more modules configured to select as the true detection including: a first module configured to select, as the true detection, the candidate detection that is within a radius for the target; and a second module configured to select, as the true detection, the candidate detection that is closest to a first known mapped pathway.

The system, further includes: the one or more modules further configured to select as the true detection including: a third module configured to select the true detection, the candidate that indicates a position and velocity that are consistent with a target traveling on a second known travel mapped pathway; and the third module configured to select a false detection, the candidate that indicates a position that is outside the second known pathway or the velocity is not consistent with the target traveling.

The system, further includes: the one or more modules further configured to select as the true detection including: a fourth module configured to compute, by a gating operation, a distance metric from the last position of a tracked target object to a predicted position less than a threshold distance related to one or more of the candidate detections. The one or more modules configured by the processor for applying the Markov Random Field (MRF) algorithm representing the tracked target object in one or more cells of an occupancy grid further including: a fifth module is configured to calculate an object measurement density for each tracked target object represented in the one or more cells of the occupancy grid; a sixth module is configured to spread the density over a window including the set of cells of the occupancy grid represented by the tracked target object; a seventh module is configured to spread velocities over the window including a same set of cells of the occupancy grid represented by the tracked target object.

The the one or more modules configured by the processor for applying mapping functions to sensed data of the environment for configuring a machine learning (ML) model of decision making behavior of the vehicle further including: an eighth module including an action risk assessment model trained using semi-supervised machine learning techniques by on-line and off-line training for mapping function to candidate actions to determine with risk factors a learned drivable path wherein the eight module in the off-line training of the ML model includes: collecting labels, co-collecting occupancy velocity grids, extracting features from the occupancy grids, and applying at least support vector machine (SVM) techniques for recognizing class patterns of the candidate actions to determine with risk factors the learned drivable path.

The one or more modules for applying adaptive threshold to cells of an occupancy grid configured for representing area of tracking of objects within the vehicle environment including: a ninth module configured to compute by an adaptive threshold occupancy density, the likelihood that a candidate action is available for the target tracked object based on the computed density distribution, and select the candidate action that has the highest probability of being available; and a tenth module configured to compute a clustering for velocity clusters for a set of candidate actions to select the target tracked object that indicates a position that is consistent with a learned drivable path. The ML model is trained using reinforcement learning techniques using a data set of past collected labels and radar data of drivable paths and wherein the eight module is configured to select the candidate action that will likely contribute to one of the drivable paths.

In yet another embodiment, a planning system of a vehicle is provided. The system includes: a sensor system configured to provide the sensor input to the processor for providing an area in the environment of vehicle for filtering target objects; and a non-transitory computer readable medium including: a first module configured to, by a processor, select, as the true detection, the candidate detection that is within a radius for the target; a second module configured to, by a processor, select, as the true detection, the candidate detection that is closest to a first known mapped pathway; a third module configured to, by a processor, select the true detection, the candidate that indicates a position and velocity that are consistent with a target traveling on a second known travel mapped pathway, and the third module configured to select a false detection, the candidate that indicates a position that is outside the second known pathway or the velocity is not consistent with the target traveling; a fourth module configured to, by a processor, compute, by a gating operation, a distance metric from the last position of a tracked target object to a predicted position less than a threshold distance related to one or more of the candidate detections; a fifth module is configured to, by a processor, calculate an object measurement density for each tracked target object represented in the one or more cells of the occupancy grid; a sixth module is configured to, by a processor, spread the density over a window including the set of cells of the occupancy grid represented by the tracked target object; a seventh module is configured to, by a processor, spread velocities over the window including a same set of cells of the occupancy grid represented by the tracked target object; an eighth module including an action risk assessment model trained using semi-supervised machine learning techniques by on-line and off-line training for mapping function to candidate actions to determine with risk factors a learned drivable path wherein the eighth module in the off-line training of the ML model is configured to, by a processor, collect labels, co-collect occupancy velocity grids, extract features from the occupancy grids, and apply at least support vector machine (SVM) techniques for recognizing class patterns of the candidate actions to determine with risk factors the learned drivable path; a ninth module configured to, by a processor, compute by an adaptive threshold occupancy density, the likelihood that a candidate action is available for the target tracked object based on the computed density distribution, and select the candidate action that has the highest probability of being available; and a tenth module configured to, by a processor, compute a clustering for velocity clusters for a set of candidate actions to select the target tracked object that indicates a position that is consistent with a learned drivable path wherein the ML model is trained using reinforcement learning techniques using a data set of past collected labels and radar data of drivable paths and wherein the eight module is configured to select the candidate action that will likely contribute to one of the drivable paths.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
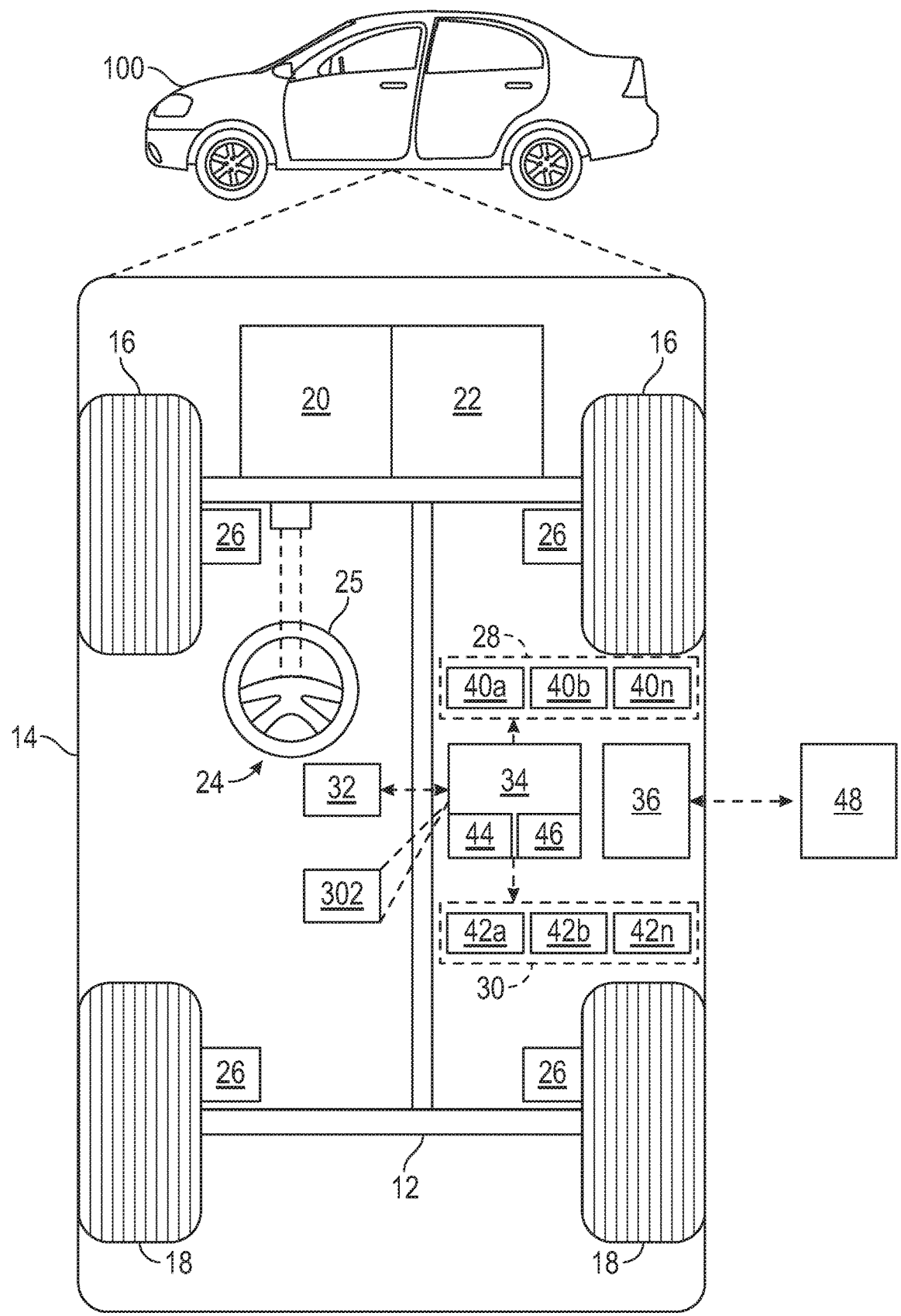
FIG. 1 depicts an example vehicle that includes a radar detection risk maneuver planning module using fuller representations of uncertainty indicators from sensed radar data, in accordance with various embodiments.

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

Autonomous vehicles, which operate in complex dynamic environments, require methods that generalize to unpredictable situations and reason in a timely manner in order to reach a level reliability and react safely even in complex urban situations. Informed decisions require accurate perception. However, current computer vision systems have yet to achieve error rates acceptable for autonomous navigation. By combining decision-making, control, and perception with machine learning techniques and complex planning and decision-making methods as described herein can be a viable option.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The subject matter described herein discloses apparatus, systems, techniques and articles for operating maneuver control and planning systems of a vehicle. The described apparatus, systems, techniques and articles are associated with a sensor system of a vehicle as well as a controller for receiving inputs from one or more sensing devices of the sensor system with levels of uncertainty for use in determining, planning, predicting, and/or performing vehicle maneuvers in real-time or in the near future, or in the future. To this end, the controller may employ at least one adaptive algorithm utilizing indicators of uncertainty with limited sensor data available and/or on a priori sensor data.

The sensing devices may include a combination of sensors of different operational modalities for gathering a variety of sensor data. For example, the sensing devices may include one or more cameras as well as radar-based or laser-based sensing devices (e.g., lidar sensing devices). That is while the disclosure describing in detail radar based scan detections, it is contemplated that the disclosure should not be so limiting an encompass a variety of different sensing devices used singularly or in combination such as sensing devices including acoustic, Lidar, image and IR sensor type devices.

During operation, the sensor system may gather sensor data, which is received by a processor of the controller. The processor may be programmed to convert the sensor data into a perception (i.e., belief) model with uncertainty factors about the vehicle and/or its environment for either decision or pre-decision maneuver planning. For example, the processor may determine where surrounding vehicles are located in relation to the subject vehicle, predict the path of surrounding vehicles, determine and track the current vehicle path, recognize pavement markings, locate pedestrians and cyclists and predict their movements, and predict with representations of uncertainties of decisions to be made for future vehicle maneuvers and more.

In some embodiments, the processor generates an occupancy grid with a plurality of cells that collectively represent the perceived environment of the vehicle. The processor calculates at least one perception datum for the different cells within the occupancy grid. The perception datum represents a perceived element of the vehicle's environment. The processor generates a representation of an uncertainty (i.e. an uncertainty factor) for the different cells, wherein the uncertainty representation can be indicative of the processor's uncertainty about the perception and future maneuver associated with the cell as a means for fuller representation and taking into account factors of this uncertainty. The perception data and uncertainty factors may be calculated from the sensor output received for the vehicle sensors using one or more estimation applications such as Bayesian, Markov or other statistical algorithms.

The perception (i.e. representation of the uncertainty) as well as the individual uncertainty factors included in the cells of the grid may be updated continuously as the vehicle operates. Additionally, the processor determines situational relevance of the different cells within the occupancy grid. Relevance may be determined in various ways.

The apparatus, systems, methods, disclosed herein may utilize results from other sensors that are present in a vehicle (e.g. cameras, other radars) to enable a more full representation of uncertainty to determine pre-decision maneuver risk indicators, which avoids the problem of reduced information due to the representation incurred in the vehicle maneuver planning.

In various exemplary embodiments, the decision indicators can still be combined together with other pre-decision indicators to achieve better planning under the uncertainty.

In various exemplary embodiments, the apparatus, systems, methods, described can be combined and enhance results from back-end processing methods providing data products to perception fusion via a representation to achieve more accurate maneuver planning under uncertainty.

The apparatus, systems, methods, disclosed herein uses a more full representation of uncertainty to determine pre-decision maneuver risk indicators, which avoids the problem of reduced information due to representation. Further, the pre-decision indicators can still be combined with other multiple approaches and/or other pre-decision indicators and planning goals to achieve better planning under uncertainty.

In various embodiments, the present disclosure provides apparatus, systems, methods, using an occupancy-velocity belief-state density grid and a belief-state Markov model to track the uncertainty over cross-traffic detection and awareness.

In various embodiments, the present disclosure provides apparatus, systems and methods that perform supervised, unsupervised and estimation modeling that learns and predicts by enhanced uncertainty representations, the risk of performing certain maneuvers such as merging into traffic at an intersection with and without extracting conventional object tracks for readily fusing sensor data with outputs of other sensors (e.g. cameras, Lidars) of the vehicle.

In various embodiments, the present disclosure provides apparatus, systems and methods for vehicle maneuvers of: merging into traffic, planning merging maneuvers under high sensing of uncertainty, handling of uncertainty more robustly, of complex (multimode) vehicle presence distribution estimations, and of conveying higher complexity information directly to discriminative pre-decision data products.

In various embodiments, the present disclosure provides apparatus, systems and methods for vehicle maneuvers: of multiple approaches of varying complexity, of reinforcement learning of maneuver risks, of occupancy-velocity grid Markov model tracking, of utilizing additional sensors present or in standalone, and of integrating with existing traditional tracking and fusion systems.

In various embodiments, the present disclosure provides apparatus, systems and methods for maneuver risk planning over specific regions of interest and only for the current belief state by a look-ahead in the belief state space to determine only those belief states that are reachable from the current state.

Instead of keeping perception modules and risk maneuver planning modules separate, an alternative framework is described herein to train certain parts of the perception module to incorporate partial tasks from the risk maneuver planning module.

FIG. 1 depicts an example vehicle 100 that includes a cross traffic tracking and maneuver risk estimation planning module for generating a fuller representation of uncertainty indicators 302 (hereinafter "maneuver risk planning module") from sensed data from a radar system (and/or other sensors). As depicted in FIG. 1, the vehicle 100 generally includes a chassis 12, a body 14, front wheels 16, and rear wheels 18. The body 14 is arranged on the chassis 12 and substantially encloses components of the vehicle 100. The body 14 and the chassis 12 may jointly form a frame. The wheels 16-18 are each rotationally coupled to the chassis 12 near a respective corner of the body 14.

In various embodiments, the vehicle 100 may be an autonomous vehicle or a semi-autonomous vehicle. An autonomous vehicle 100 is, for example, a vehicle that is automatically controlled to carry passengers from one location to another. The vehicle 100 is depicted in the illustrated embodiment as a passenger car, but other vehicle types, including motorcycles, trucks, sport utility vehicles (SUVs), recreational vehicles (RVs), marine vessels, aircraft, etc., may also be used.

As shown, the vehicle 100 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel 25 for illustrative purposes, in some embodiments contemplated within the scope of the present disclosure, the steering system 24 may not include a steering wheel.

The sensor system 28 includes one or more sensing devices 40a-42n that sense observable conditions of the exterior environment and/or the interior environment of the vehicle 100 (such as the state of one or more occupants) and generate sensor data relating thereto. Sensing devices 40a-42n might include, but are not limited to, radars (e.g., long-range, medium-range-short range), lidars, global positioning systems, optical cameras (e.g., forward facing, 360-degree, rear-facing, side-facing, stereo, etc.), thermal (e.g., infrared) cameras, ultrasonic sensors, odometry sensors (e.g., encoders) and/or other sensors that might be utilized in connection with systems and methods in accordance with the present subject matter.

The actuator system 30 includes one or more actuator devices 40a-42n that control one or more vehicle features such as, but not limited to, the propulsion system 20, the transmission system 22, the steering system 24, and the brake system 26. In various embodiments, vehicle 100 may also include interior and/or exterior vehicle features not illustrated in FIG. 1, such as various doors, a trunk, and cabin features such as air, music, lighting, touch-screen display components (such as those used in connection with navigation systems), and the like.

The data storage device 32 stores data for use in automatically controlling the vehicle 100. In various embodiments, the data storage device 32 stores defined maps of the navigable environment. In various embodiments, the defined maps may be predefined by and obtained from a remote system. For example, the defined maps may be assembled by the remote system and communicated to the vehicle 100 (wirelessly and/or in a wired manner) and stored in the data storage device 32. Route information may also be stored within data storage device 32—i.e., a set of road segments (associated geographically with one or more of the defined maps) that together define a route that the user may take to travel from a start location (e.g., the user's current location) to a target location. As will be appreciated, the data storage device 32 may be part of the controller 34, separate from the controller 34, or part of the controller 34 and part of a separate system.

The controller 34 includes at least one processor 44 and a computer-readable storage device or media 46. The processor 44 may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 100. In various embodiments, controller 34 is configured to implement a mapping system as discussed in detail below.

The instructions may include one or more separate programs, each of which includes an ordered listing of executable instructions for implementing logical functions. The instructions, when executed by the processor 44, receive and process signals (e.g., sensor data) from the sensor system 28, perform logic, calculations, methods and/or algorithms for automatically controlling the components of the vehicle 100, and generate control signals that are transmitted to the actuator system 30 to automatically control the components of the vehicle 100 based on the logic, calculations, methods, and/or algorithms. Although only one controller 34 is shown in FIG. 1, embodiments of the vehicle 100 may include any number of controllers 34 that communicate over any suitable communication medium or a combination of communication mediums and that cooperate to process the sensor signals, perform logic, calculations, methods, and/or algorithms, and generate control signals to automatically control features of the vehicle 100.

The communication system 36 is configured to wirelessly communicate information to and from other entities 48, such as but not limited to, other vehicles ("V2V" communication), infrastructure ("V2I" communication), networks ("V2N" communication), pedestrian ("V2P" communication), remote transportation systems, and/or user devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

Figure 2:
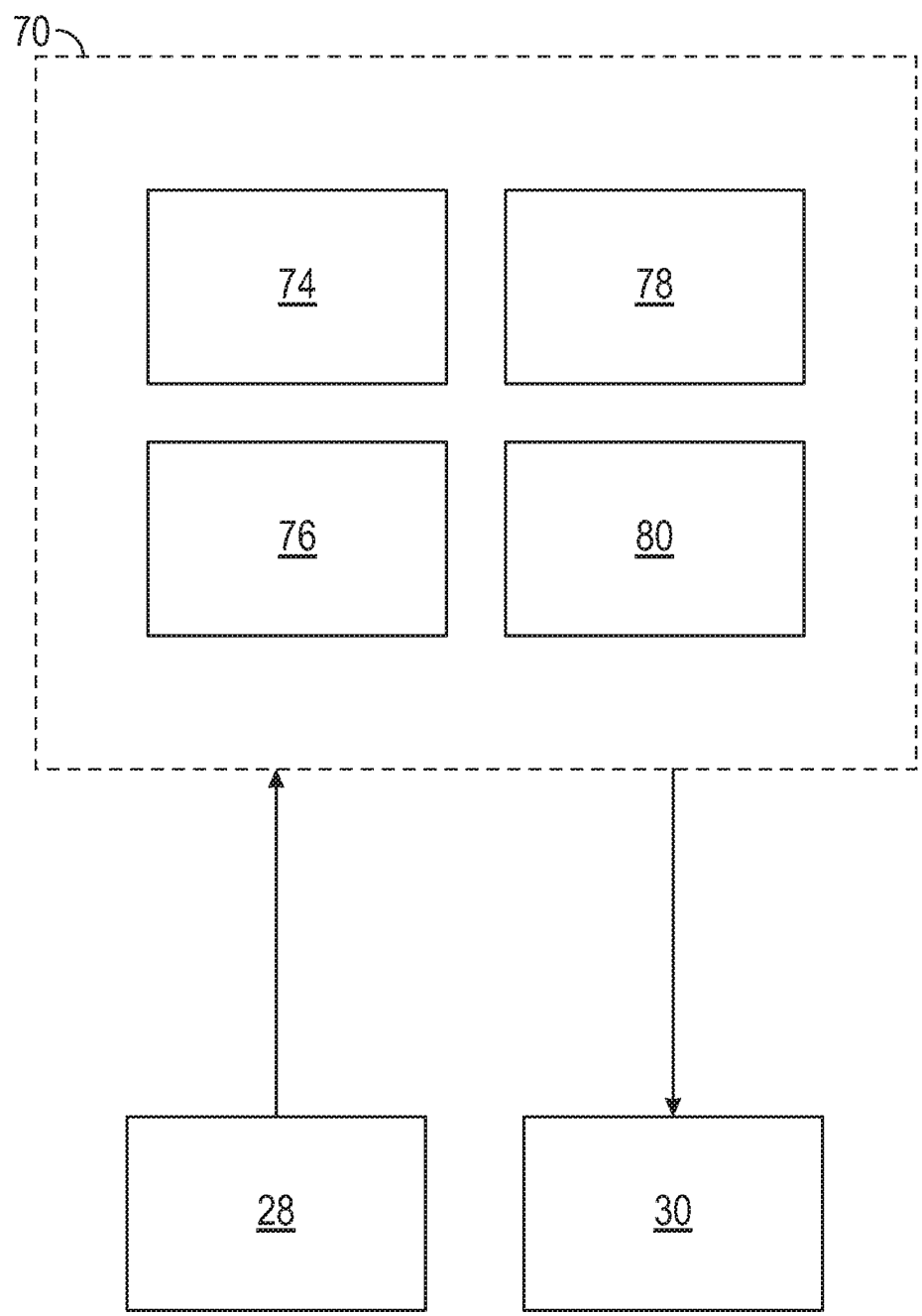
FIG. 2 is a functional block diagram illustrating an autonomous driving system (ADS) associated with an autonomous vehicle, in accordance with various embodiments.

In accordance with various embodiments, controller 34 may implement an autonomous driving system (ADS) 70 as shown in FIG. 2. That is, suitable software and/or hardware components of controller 34 (e.g., processor 44 and computer-readable storage device 46) may be utilized to provide an autonomous driving system 70 that is used in conjunction with vehicle 100.

In various embodiments, the instructions of the autonomous driving system 70 may be organized by function or system. For example, as shown in FIG. 2, the autonomous driving system 70 can include a perception system 74, a positioning system 76, a path planning system 78, and a vehicle control system 80. As can be appreciated, in various embodiments, the instructions may be organized into any number of systems (e.g., combined, further partitioned, etc.) as the disclosure is not limited to the present examples.

In various embodiments, the perception system 74 synthesizes and processes the acquired sensor data and predicts the presence, location, classification, and/or path of objects and features of the environment of the vehicle 100. In various embodiments, the perception system 74 can incorporate information from multiple sensors (e.g., sensor system 28), including but not limited to cameras, lidars, radars, and/or any number of other types of sensors. In various embodiments, all or parts of the radar detections may be included within the perception system 74.

The positioning system 76 processes sensor data along with other data to determine a position (e.g., a local position relative to a map, an exact position relative to a lane of a road, a vehicle heading, etc.) of the vehicle 100 relative to the environment. As can be appreciated, a variety of techniques may be employed to accomplish this localization, including, for example, simultaneous localization and mapping (SLAM), particle filters, Kalman filters, Bayesian filters, and the like.

The path planning system 78 processes sensor data along with other data to determine a path for the vehicle 100 to follow. The vehicle control system 80 generates control signals for controlling the vehicle 100 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

In various embodiments, the positioning system 76 is configured to determine where the vehicle 100 is located or positioned within the grid (i.e. occupancy grid), and the dynamic object detections determine where moving objects are located relative to the vehicle 100 within the grid (not shown). Sensor input from the sensing devices 40*a*-40*n* may be processed by the maneuver risk planning module 302 for making these determinations. Also, in some embodiments, the vehicle positioning system 76 and/or the path planning system 78 communicate with the other entities to determine the relative positions of the vehicle 100 and the surrounding vehicles, pedestrians, cyclists, and other dynamic objects.

More specifically, the sensor input to the risk maneuver planning module 302 may be radar-based and/or laser-based (lidar) detections from one or more of the sensing devices 40*a*-40*n*. The maneuver risk planning module 302 may filter and determine which of the detections are dynamic objects (moving objects that are actually on the road).

The maneuver risk planning module 302 may process this information and generate a Markov random field (MRF) (i.e., Markov network, undirected graphical model, etc.) to represent the dependencies therein. Using this information, and using a reinforcement training process, the maneuver risk planning module 302 may determine (i.e., predict) the risk associated with initiating (i.e., executing) a particular maneuver (e.g., a right turn into cross traffic).

From that prediction function, the maneuver risk planning module 302 may determine the degree to which individual cells influence the risk prediction output. In some embodiments, the maneuver risk planning module 302 may identify which of the sensing devices 40*a*-40*n* have the most influence on the maneuver risk prediction, and those sensing devices 40*a*-40*n* may correlate to certain ones of the cells. The cells that are identified as having higher influence on risk prediction are identified by the maneuver risk planning module 302 as being more relevant than the others.

Figure 3:
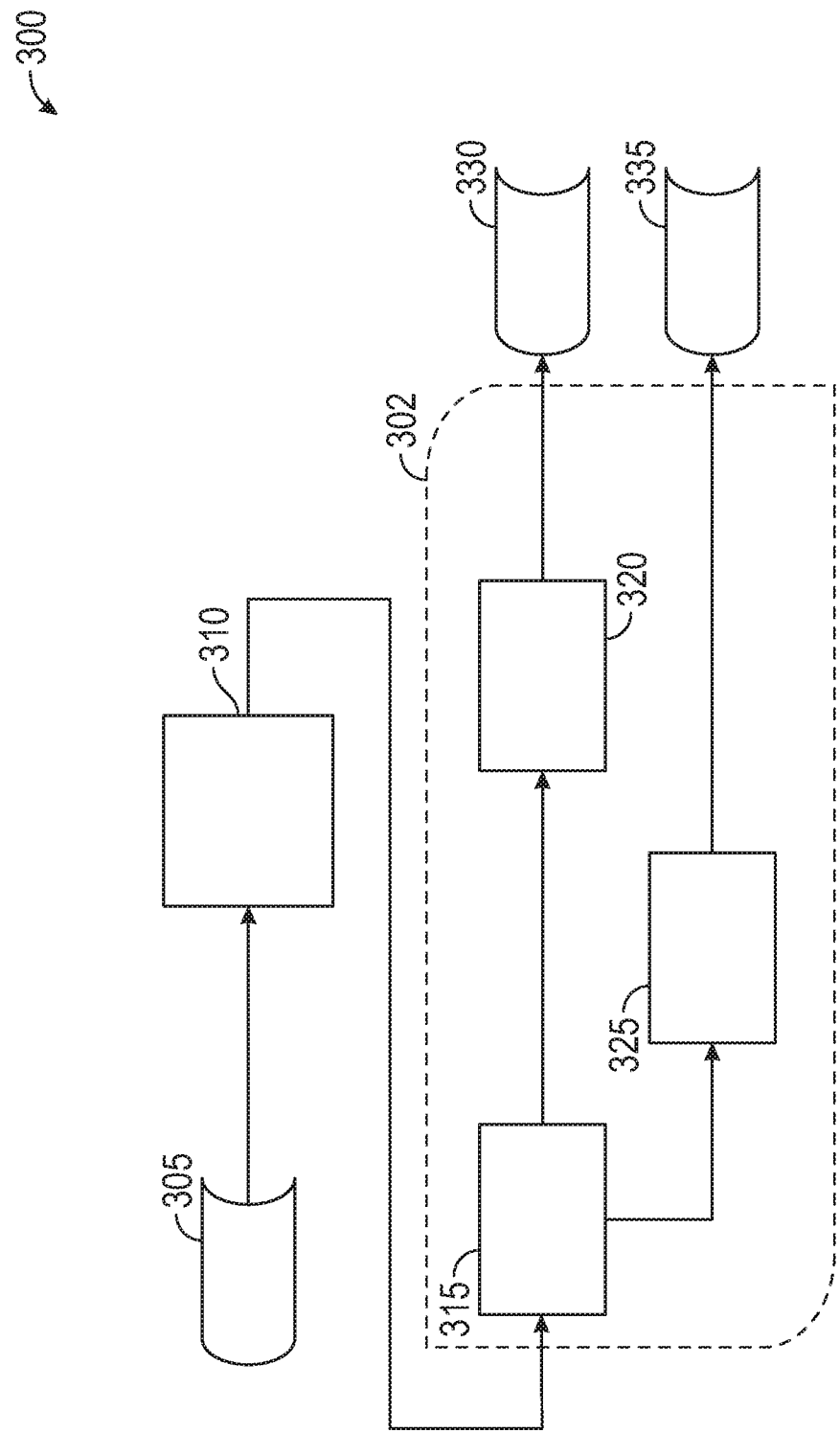
FIG. 3 is a block diagram depicting an example radar detections maneuver risk planning module for use in a vehicle, in accordance with various embodiments.

FIG. 3 is a high level block diagram depicting an example maneuver risk planning module 302 for providing action risk assessment and object extraction data for use within behavior 330 and perception systems of a vehicle, in accordance with an embodiment. The example maneuver risk planning module 302 is configured to apply one or more tracking and estimation modules to a plurality of radar scan detections from a radar 305 (with n scans ($\Delta T$)) for target detection with pre-filtering sensed data from a prefiltering module 310 to configure an occupancy velocity belief state density grid.

In various exemplary embodiments, the maneuver risk planning module determines the relevance uncertainty indicators (i.e. also known as uncertainty factors) that include relevance uncertainty indicators for the different areas. This includes processing the sensor data to: recognize a current situation of the vehicle and accordingly pre-decision predicting the uncertainty indicators for assessing the risk of executing a particular vehicle maneuver; determine in pre-decision planning the degree of influence that a particular uncertainty indicator has on the different areas on the prediction; and calculate the maneuver risk indicator for the different areas according to the determined degree of influence, including calculating higher levels of maneuver risk indicators for areas having higher degrees of influence. Also, the control command from the AV perception module 335 includes generating the control command for the maneuver as a function of the uncertainty indicator and the maneuver risk relevance factor.

The maneuver risk planning module 302 is programmed to generate a Markov random field (MRF) from a Markov Random Field module 315 to recognize the current situation and for applying a belief state Markov model to determined uncertainty indicators over the target (i.e. cross-traffic) objects from the radar scan data detections received over a prescribed period of time. The plurality of modules in the example maneuver risk planning module 302 includes the Markov Random Field (MRF) module 315 for recognizing the current situations, for generating occupancy velocity grid data, and for populating cells of the occupancy velocity grid. The action risk assessment module 320 receives data in cells of the occupancy velocity and generates uncertainty indicators for actions mapped to the cells for action-risk mapping and pre-decision making. The object extraction module 325 generates object tracks based on data from cells populated in the occupancy velocity grid for common areas of perception from the radar sensor 305 input to provide object track data corresponding to the relevance uncertainty indicators for pre-decision making for different areas within the perception.

The example pre-filtering module 310 further includes a pre-filtering module 310 configured to select the one or more mapping and gating modules to apply to determine which of a plurality of radar target detections is a likely true detection. The example maneuver risk planning module 302 is further configured to output the likely detection determined by the pre-filtering module 310. The radar detections for the maneuver risk planning module 302 may be implemented on the controller 34 of FIG. 1, or on a separate controller, or on a combination of controllers, in various embodiments.

Figure 4:
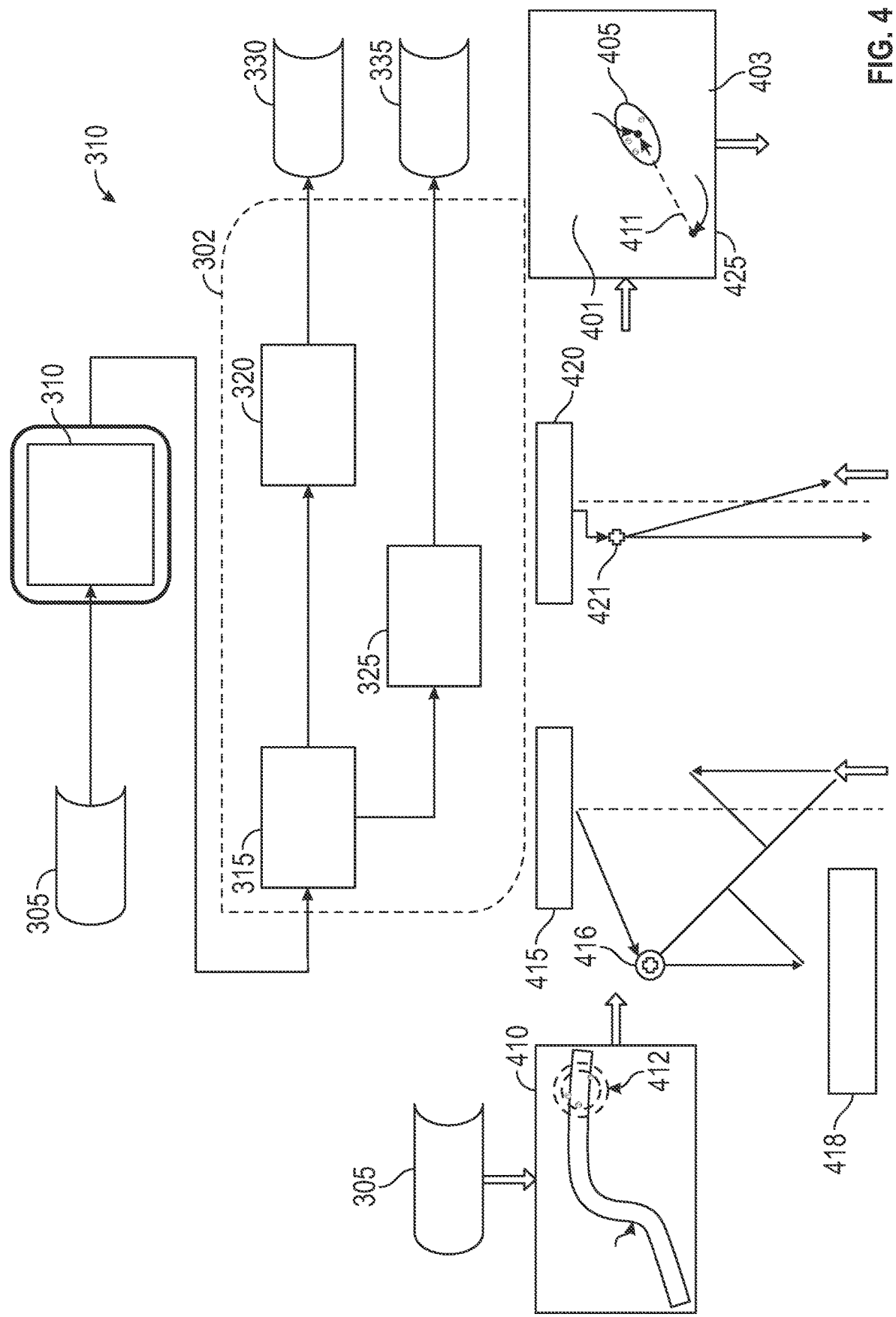
FIG. 4 is a diagram depicting an example illustration of the use of an example pre-filtering module with track gating to select the more likely true detection between multiple radar candidate detections received from radar sensors, in accordance with various embodiments.

In FIG. 4, the prefiltering module 310, performs map filtering steps of sensed data from road data, and road speed data from the radar scan detections from the radar 305 (with n scans (ΔT)) to configure an occupancy velocity belief state density grid. The map matching module 410 is where scan detections are mapped between the sensor domain and the map domain.

Referring to FIG. 4, the example map matching module 410 is configured to select the more likely true detection of target 421 between multiple false/true radar candidate detections by selecting a candidate detection that is closest to a known target path and less than some maximum distance threshold distance away from the target path. The selection module (road speed filter 418) may choose the map matching module 410 to select the more likely true detection of target 421 if a map of the area in the vicinity of the vehicle is available and/or alternate true/false detection methods are not available.

The example map matching module 410 is configured to use the position of a road on an area map to gain knowledge of valid target positions, if an area map is available. The example map matching module 410 is also configured to infer a valid target position from camera data, path plan data, map data (e.g., from lane, curb detection, target trails). The example map matching module 410 is configured to select the candidate detection that is closest to a known target path (e.g., middle of the road) and less than a maximum threshold distance (as determined from a calculated function of angle and distance from host to target point) away from the target path (i.e. the center line of the road). The map could be a detailed previously existing map or a coarse map region derived from detection results from an imaging device such as a camera.

After obtaining the road data, and a speed estimation of the vehicle and target moving targets, map matching can be applied to target position a measurement of distance between the projected points (i.e. true moving targets), $P_1$, $P_2$, $P_3$ in a radius range defined by a circle 412 of each of the points $P_1$ to $P_3$. A determination of target points (in this case $P_1$ to $P_3$) detected within a map matching area by the pre-filtering module 310 of false detections 415 and true detections 420 based on the expected speed, the direction of the moving target and assumptions of driving around the center of the lane. That is, the pre-filtering module calculates the apparent static range of the target and the measured velocity of the target on the road to make the determinations of a false detection 415 or a true detection 420.

The example false detections and true detection on the map module 308 is configured, at discrete instances in time, to: (a) calculate the apparent static range rate (srr) of each target; (b) calculate the road speed of each target, assuming the target is traveling on the road; and (c) filter out (e.g., reject) candidate detections that are inconsistent with a target travelling on the road. In this example, the target 416, at this time instance, is not positioned on the road and its associated candidate detection is filtered out. In the example, the target 421, at this time instance, is positioned in a lane on the road, its direction of travel is consistent with the direction of travel for the lane, and its speed is consistent with the speed limit for the lane. Consequently, the candidate detection associated with target 421, at this instance in time, is not filtered out.

After making this determination, the predicted position by track gating module 425 (or batch gating) of the received sensed data, a predicted position based on the last position is calculated. The example track gating module 425 is configured to select the more likely true detection in circle 412 between multiple uncertain candidate detections by choosing a candidate that is closest to a predicted target position as a true radar detection. The map matching module 410 may choose the track gating module 425 if radar tracks already exist for a target and/or alternate tracking and estimation methods are not available.

The example track gating module 425 is configured to (a) compute, for each existing radar track, a distance metric to each true candidate detection (i.e. $P_1$, $P_2$, $P_3$); (b) predict a next position of a target position using a prediction filter (e.g., a Kalman filter); and (c) select the true candidate detections (i.e. target 421) that is closest to the predicted next position and less than a threshold distance away from the predicted next position. The distance metric can include, but is not limited to, the Euclidian distance or the Mahalanobis distance; the latter of which can be calculated with knowledge of the predicted position covariance obtained from a Kalman filter.

In one example, the track gating module 425 may choose a candidate that is closest to a predicted target position 401 for a radar detection by computing, for each existing radar track, a distance metric from the last position 403 of a tracked target to each candidate detection; applying a Kalman filter to predict the next position of the tracked target and converting the predicted next position to the measurement plane (e.g., for linear KF, $y^-=H\hat{x}$); computing squared Mahalanobis distance $d_k^2=(y^-)^T S^{-1} y^-$ where $S=R+HP^-H^T$ for candidate detection $k \in \{1, 2, \ldots\}$ (can alternatively use Euclidian distance); and, for each existing radar track 411, gating the candidate detection, using the knowledge that $d_k^2$ is chi-squared distributed to pick a threshold T for a percentile P (e.g., 95%), and associating detection k with the track if $d_k^2 < T$. In the event that multiple uncertain detections fall within the gate 405, the detection with the shortest Mahalanobis distance is chosen.

The example track gating module 425 is configured to access a prediction filter (e.g., a Kalman filter) to obtain a predicted location 401 for a target based on the last position 403 for the target. Using the predicted location 401, the example track gating module 425 is configured to identify a gate region 405 (e.g., apply a gate) that is within a threshold distance away from the next predicted location 401. The example track gating module 425 is configured to select the likely true detection by selecting the nearest true candidate detection (e.g., candidate detection for target 421) that is within the gate region 405 as the likely true detection.

Figure 5:
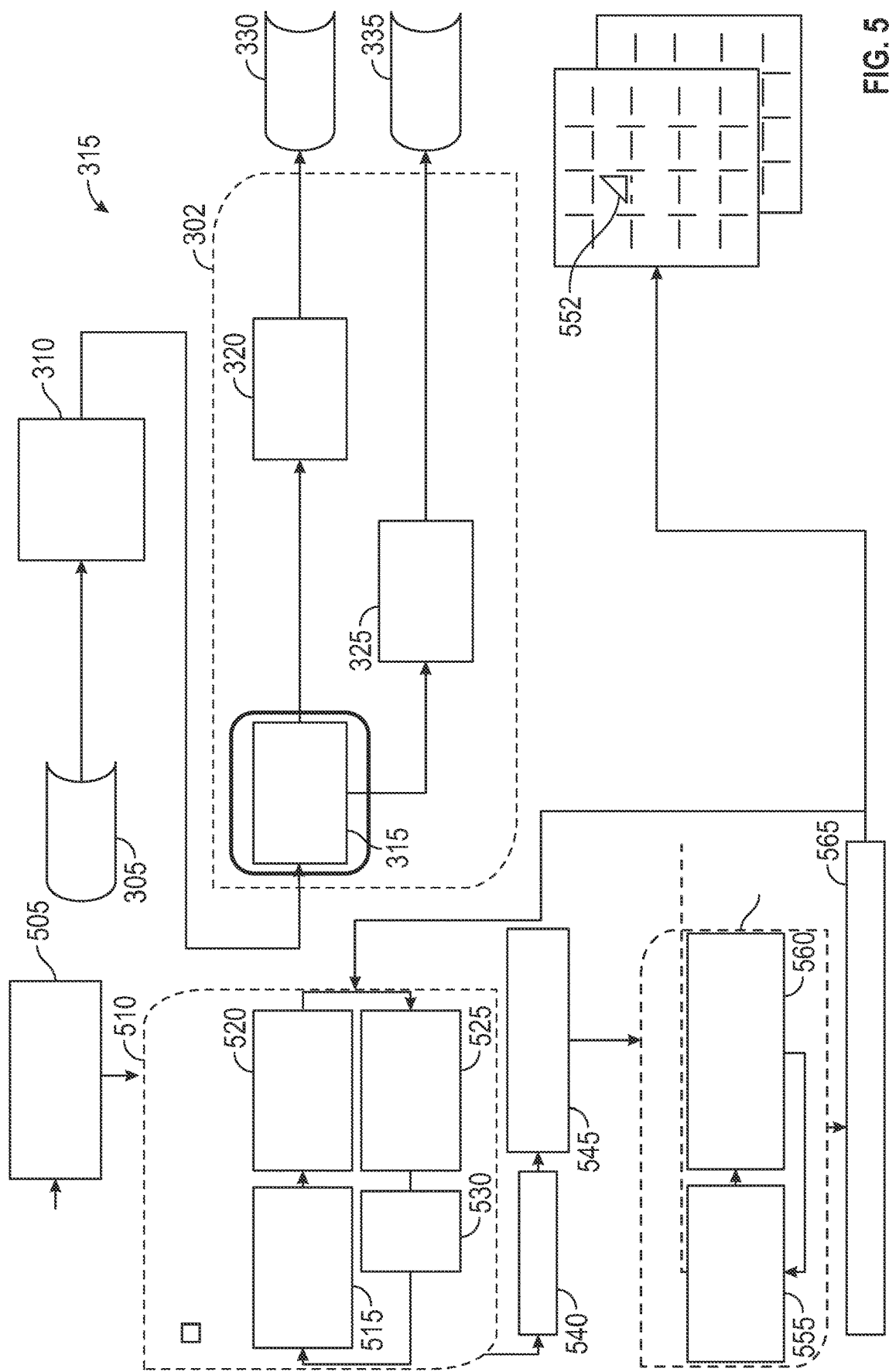
FIG. 5 is a diagram depicting an example illustration of the use of an example Markov Random Field (MRF) Module for generating a belief-state Markov model to track the uncertainties over cross-traffic detections, in accordance with various embodiments.

FIG. 5 illustrates a diagram of the Markov Random Field (MRF) module for recognizing the current situation and applying a belief state Markov model to determined uncertainty indicators over the target (i.e. cross-traffic) objects from the radar scan data detections which have been received over a prescribed period of time, in accordance with an embodiment. The MRF 315 module (i.e., Markov network, undirected graphical model, etc.) to represent the dependencies for the uncertainty indicators for pre-decision planning. Using this information, and using a reinforcement training process, the maneuver risk planning module 302 may determine (i.e., predict) the risk associated with initiating (i.e., executing) a particular maneuver (e.g., a left or right turn into cross traffic).

In FIG. 5, the Markov Random Field (MRF) module 315 receives filtered static and dynamic targets that have been clustered into dynamic objects by clustering and module 505 (of FIG. 5) for recognizing the current situations, for generating occupancy velocity grid data, and for populating cells of the occupancy velocity grid. The MRK module 315 in a measurement grid aggregation module 510 fills in a measurement grid with dynamic objects from the clustering step. The measurement grid aggregation module 510 cycles through a feedback loop of processing steps to fill each available cell of the grid in an incremental step by step manner until all the pipeline of each dynamic objects received is exhausted or the grid is deemed sufficiently filled (i.e. in accordance with a prescribed time period) or until completion. The cyclic processing steps for each dynamic object includes calculating the object measurement density 515, spreading the density over 2D cell windows 520, spreading the velocities over the same 2D cell windows 525 and adding the calculated spread densities, velocities of each object to the grid 530, and repeating the cycle until completion, until the grid is full, or until deemed sufficiently complete. Once the dynamic objects are added to the grid, the densities are summed by summing module 540 by a calculation function. Next, by a calculation function, the velocities are averaged or weighted by factors across the cells of the cell window by a weighted average velocity module 545 for density-velocity measurement grid representations.

In various exemplary embodiments, a Bayesian update 550 is provided for the example density and velocity modelling on the measurement aggregation grid for each dynamic object. The Bayesian update 550 includes update velocity based on Bayesian occupancy weighting 560 from input of an update occupancy gird probabilities module 555 calculation In some embodiments, the MRF module 315 calculate the uncertainty data for the cells 552) using one or more Bayesian algorithms. The calculations are used to quantify, for different cells 552, expected error (i.e., information gain) computed as true occupancy ($Ø \in \{0,1\}$), minus an estimate (p) squared, multiplied by probability with respect to occupancy. In this context, occupancy grid algorithms are used to compute approximate posterior estimates for these random variables. Stated differently, expected prediction error (i.e., the uncertainty factor) calculated by the update occupancy grid probabilities module 555 for each grid cell may be calculated according to the following equation (1):

$$E[(Ø-p)^2] = \Sigma_{Ø \in \{0,1\}}(Ø-p)^2 P(Ø) = (0-p)^2(1-p)+(1-p)^2 p = p(1-p)$$

wherein Ø represents true occupancy, p represents the estimate, and P represents probability.

In addition, a Bayesian update 550 may be performed for a given cell 552 according to the following equation (2):

$$p_{post} = \frac{(1-a)^{(n-k)}a^k p}{(1-a)^{(n-k)}a^k p + (1-b)^{(n-k)}b^k(1-p)}$$

wherein n represents the number of observations at a given cell, k represents the number of detections, a represents detections (P), b represents false-alarm (P), and p represents occupancy (P).

Accordingly, the perception module 335 (of FIG. 3) may calculate posteriors for a given cell 552 according to equation (2). Additionally, the perception module 335 may calculate the expected future uncertainty for the cells 552 for use in risk assessments according to the following equation (3):

$$E[RMSE] = \sqrt{p(1-p)}(\sqrt{ab} + \sqrt{(1-a)(1-b)})^n$$

Thus, the perception module 335 may create a heuristic model 565 which can be used for compensating for uncertainties and adaptively controlling the sensing devices 40a-42n. For a given cell 552 within the grid, the perception module 335 determines how much uncertainty will be increased or reduced if one or more sensing devices 40a-42n were used to the corresponding physical space in the environment defined by the occupancy grid. In some embodiments, the adaptive sensor control system 34 relies on this information (uncertainty reduction in the cells 552) when generating sensor control commands to the sensing devices 42a-42n.

Figure 6:
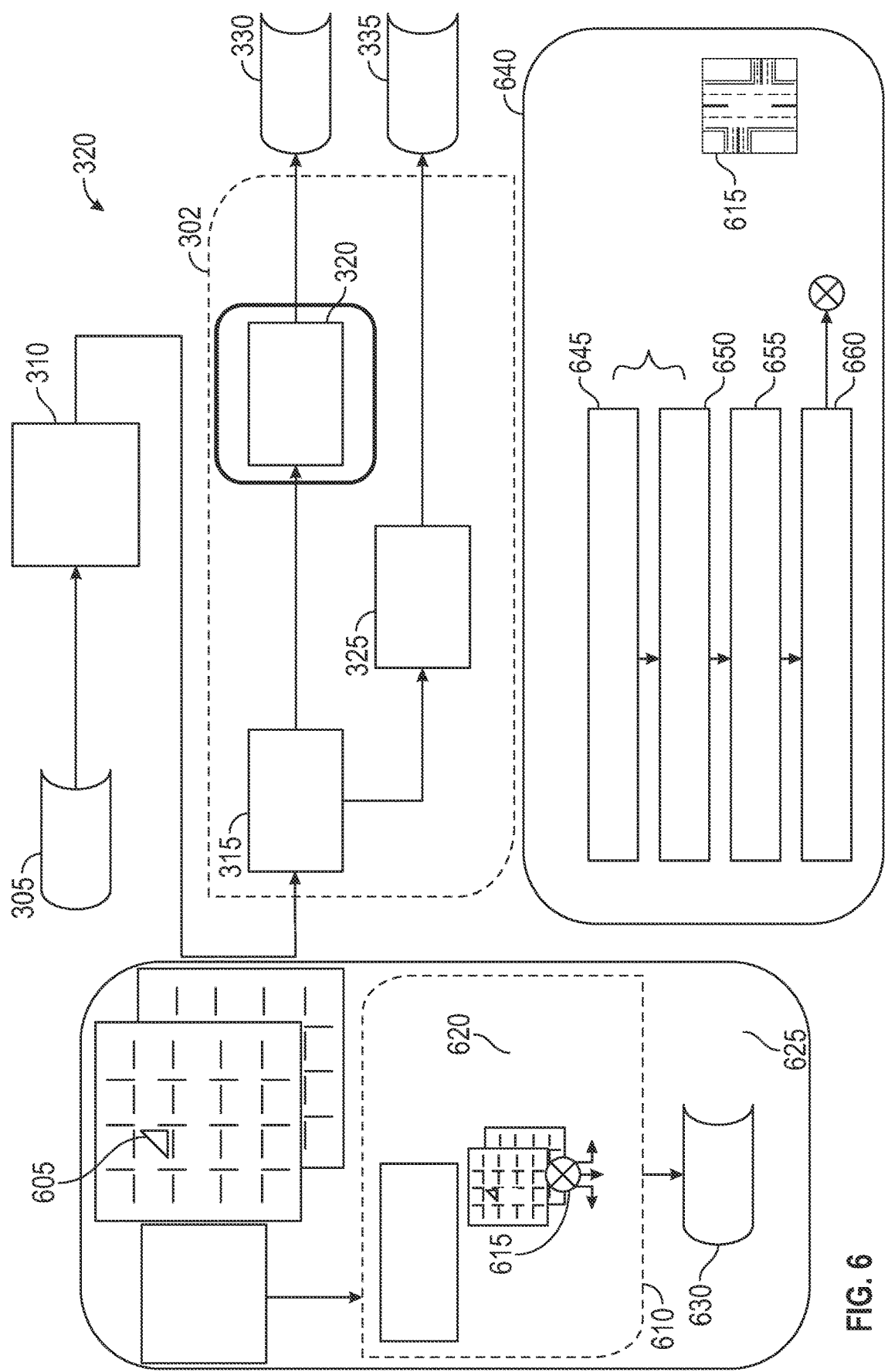
FIG. 6 is a diagram depicting an example illustration of the use of an example action risk assessment module that by semi-supervised Machine Learning (ML) modeling and training uses path plan data to select the more likely true action candidate between multiple action candidate detections to predict drivable paths, in accordance with various embodiments.

FIG. 6 illustrates a diagram of an action risk assessment module for processing data from cells of the occupancy velocity grid in accordance with an embodiment. In FIG. 6, the action risk assessment module 320 receives data in cells of the occupancy velocity and applies mapping functions with uncertainty indicators for action candidates for use in action-risk mapping and pre-decision making.

The example action risk assessment module 320 in FIG. 6 is configured to select the more likely true action candidates by applying a mapping function 610 based on the sensed occupancy velocity data 605 from the occupancy velocity grid 600. Each sensed occupancy velocity data 605 from each cell when applying a mapping function 610 is capable of generation multiple actions candidate 620. Using a trained machine learning (ML) model 615 with risk vectors 625 for each of the multiple action candidates 620 pre-decision maneuver behavior can be modeled. For example, the action candidates 620 can include straight, right and left pre-decision maneuvers in the trained ML model 615. The ML model 615 is configured to predict drivable paths, determine which of the risk vectors contributes to the action candidates to predict the drivable paths, and select candidate actions that contribute to the drivable paths as the more likely true action candidates.

Also, off-line semi-supervised re-enforcement learning can be modeled by an example reinforcement learning off-line training module 640 contributing to the action risk mapping with historical, stored data or cloud data from labels form related video of the locality of interest and corresponding sensor data. The example reinforcement learning off-line training module 640 includes a trained ML model that was trained to predict future traversable paths through traffic using action candidate detections. The example reinforcement learning (discriminator) off-line module 640 is configured to collect labels 645 for determining maneuvers such as "it is safe to turn left?"; to co-collect occupancy grids (MRF) 650 for applying mapping functions 610 to generate action candidates off-line, to extract features from grids 655 to the trained ML model to predict drivable paths, and to apply support machine vectors (SVM) and Gaussian Process 660 for recognizing class patterns of action candidates to determine which of the action candidates contribute to the drivable paths, and select action candidates that contribute to the drivable paths as the more likely true action candidates for sending to the ML model 615 enabling learned mapping functions to be applied in the ML model 615. By applying both labeling and risk vector indicators, the behavior module 630 can collect behavior labels such as "is it safe to do behavior B?" . . . etc. in real-time.

In various exemplary embodiments, a collected labeled data set of historical radar data such as velocity data and drivable paths that can be generated from data concerning prior paths driven by the vehicle. The historical sensor data can be used to train using reinforced learning techniques, the ML model 615 to predict drivable paths based on action candidate detections. After the ML model 615 is trained to predict drivable paths based on action candidate detections, real-time sensor data can be applied to the ML model.

Figure 7:
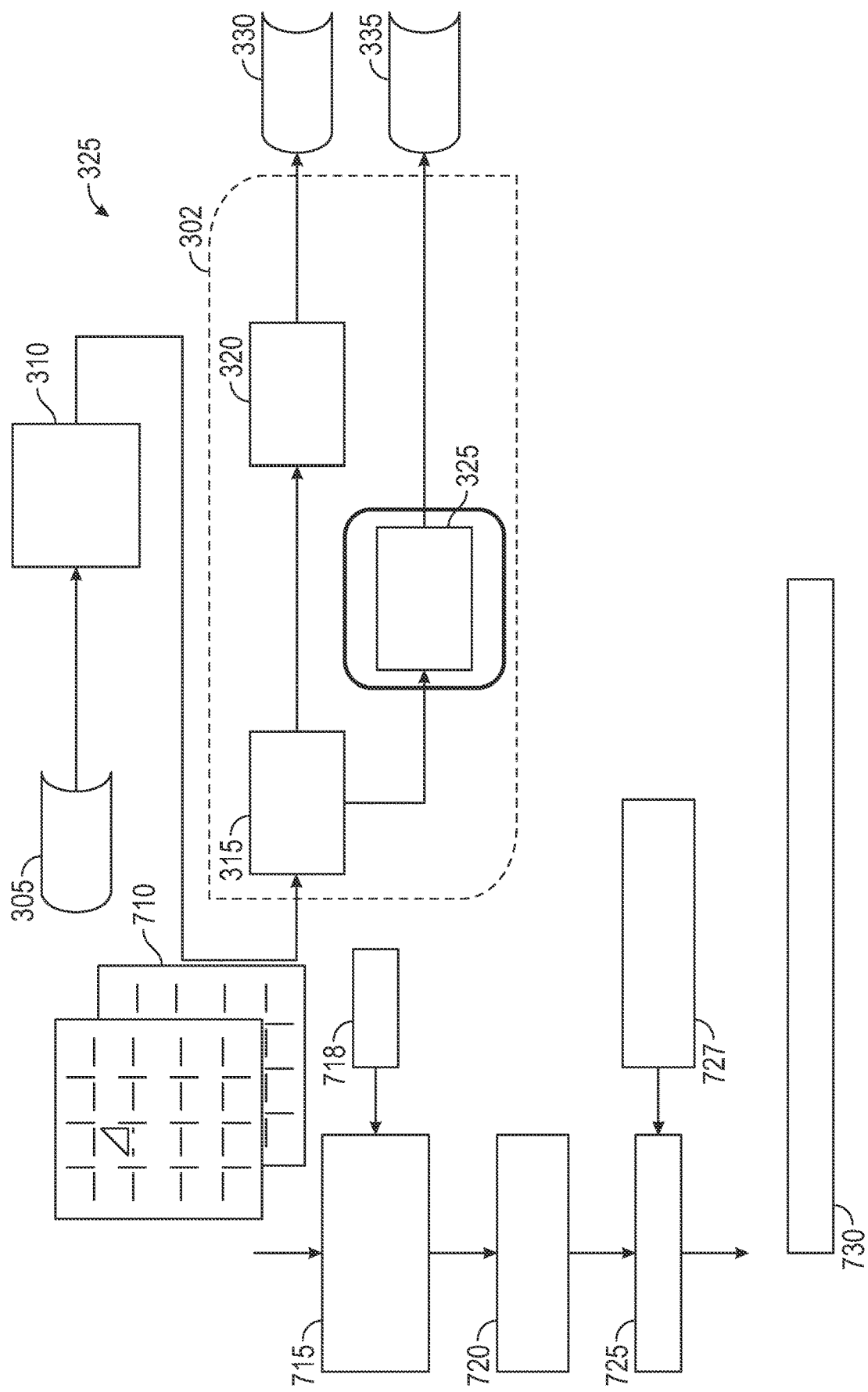
FIG. 7 is a diagram depicting an example illustration of the use of an example object extraction for object tracking using adaptive threshold occupancy grid density cells, in accordance with various embodiments.

FIG. 7 illustrates a diagram of the object extraction module for generating object tracks for pre-decision making by the risk maneuver planning module, in accordance with an embodiment. The object extraction module 325 (of FIG. 7) generates object tracks based on data from cells populated in the occupancy velocity grid 710 for areas of perception from sensed data to provide object track data corresponding with the relevance uncertainty indicators represented for different areas within a perception grid for publishing. The occupancy velocity grid 710 is configured with an adaptive threshold of the occupancy density cells 715 by receiving threshold 718 inputs to adaptively configure the threshold occupancy cell densities to ensure that the uncertainty indicators are effectively incorporated in the occupancy velocity grid 710. That is, high probability locations use a bottom up physical based clustering 720 and were velocity cluster centers can be associated 725 with object tracks 730 so that regions with high uncertainty can be distinguished from those with low uncertainty. The process includes feedback of prior detected velocity clusters 727 for efficiency. The object tracks 730 resulting are published in object representations for ML models of vehicle perception.

Figure 8:
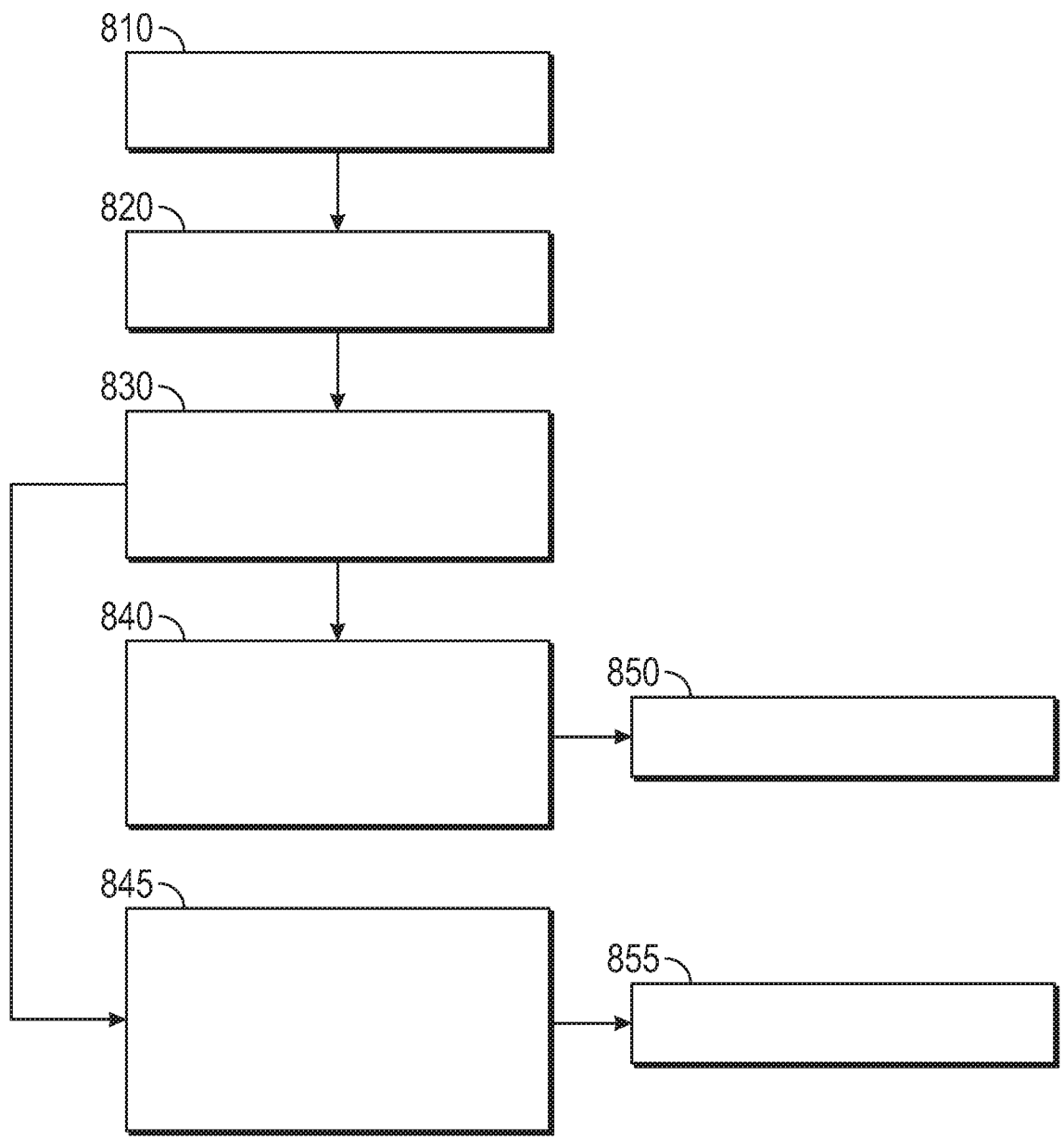
FIG. 8 is a process flow chart depicting an example process for maneuver risk assessments of uncertainties to predict drivable paths based on multiple radar candidate detections, in accordance with various embodiments.

FIG. 8 is a process flow chart depicting an example process for maneuver risk assessments with uncertainties to predict drivable paths based on multiple radar candidate detections, in accordance with various embodiments.

In the flowchart of FIG. 8, at task 810 a number of radar scans of a time period generate sensed data for processing for receipt. It is contemplated that a variety of sensor devices including near distance, long distance, image, light, acoustic and IR sensing devices may be used or incorporated for generating the sensed data sets, and the disclosure is not limited to radar data.

Next, at task 820 processing steps for mapping and tracking of dynamic targets are performed. The prefiltering module (i.e. 310 of FIG. 4), performs map filtering steps of sensed data from road data, and road speed data from the radar scan detections from the radar (with n scans ($\Delta T$)) for configuring an occupancy velocity belief state density grid representing regions of interest about the vehicle. The example map matching module selects the more likely true detection of target between multiple false/true radar candidate detections by selecting a candidate detection that is closest to a known target path and less than some maximum distance threshold distance away from the target path. The selection module may choose the map matching module for selecting the more likely true detection of target if a map of the area in the vicinity of the vehicle is available and/or alternating true/false detection methods are not available. The example map matching module uses the position of a road on an area map to gain knowledge of valid target positions, if an area map is available. The example map matching module is also configured to infer a valid target position from camera data, path plan data, map data (e.g., from lane, curb detection, target trails). The example map matching module is configured to select the candidate detection that is closest to a known target path (e.g., middle of the road) and less than a maximum threshold distance (as determined from a calculated function of angle and distance from host to target point) away from the target path (i.e. the center line of the road). The map could be a detailed previously existing map or a coarse map region derived from detection results from an imaging device such as a camera.

At task 830, the MRK algorithm is used for generating a grid based dynamic model to determine uncertainty indicators over the target (i.e. cross-traffic) objects. The MRF (i.e. 315 of FIG. 5) determines (i.e., predict) the risk associated with initiating (i.e., executing) a particular maneuver (e.g., a left or right turn into cross traffic). The processing steps include the Markov Random Field (MRF) module receiving filtered static and dynamic targets for recognizing the current situations, for generating occupancy velocity grid data, and for populating cells of the occupancy velocity grid; applying a measurement grid aggregation module for filling in a measurement grid with dynamic objects from the clustering step. A feedback loop of processing steps to fill each available cell of the grid in an incremental step by step manner until all the pipeline of each dynamic objects received is exhausted or the grid is deemed sufficiently filled (i.e. in accordance with a prescribed time period) or until completion. The cyclic processing steps for each dynamic object includes calculating the object measurement density, spreading the density over 2D cell windows, spreading the velocities over the same 2D cell windows and adding the calculated spread densities, velocities of each object to the grid, and repeating the cycle until completion, until the grid is full, or until deemed sufficiently complete. Once the dynamic objects are added to the grid, the densities are summed; and the velocities are averaged or weighted by factors across the cells for density-velocity measurement grid representations. Also, a Bayesian update is provided for the example density and velocity modelling and includes update velocities based on Bayesian occupancy weighting.

At task 840, an action risk assessment using semi-supervised ML model training with off-line training is performed. The example action risk assessment module selects the more likely true action candidates by applying a mapping function based on the sensed occupancy velocity data and then applies a trained machine learning (ML) model with risk vectors for each of the multiple action candidates so that pre-decision maneuver behavior can be modeled. For example, the action candidates can include straight, right and left pre-decision maneuvers in the trained ML model. The ML model predicts drivable paths, determines which of the risk vectors contributes to the action candidates to predict the drivable paths, and select candidate actions that contribute to the drivable paths as the more likely true action candidates for the behavior modeling 850.

Also, tasks, at 840, related to off-line semi-supervised re-enforcement learning are modeled by an example reinforcement learning off-line training module contributing to the action risk mapping with historical, stored data or cloud data from labels form related video of the locality of interest and corresponding sensor data. The example reinforcement learning off-line trained ML model predicts future traversable paths through traffic using action candidate detections by collecting labels for determining maneuvers such as "it is safe to turn left?"; co-collecting occupancy grids (MRF) for applying mapping functions to generate action candidates off-line, extracting features from grids for training the ML model to predict drivable paths, and finally, applying support machine vectors (SVM) and Gaussian Process for recognizing class patterns of action candidates to determine which of the action candidates contribute to the drivable paths for the behavior modeling 850.

At task 845, the processing steps for object extraction using adaptive threshold of occupancy grid densities for object based representations is performed. The object extraction module (i.e. 325 of FIG. 7) performs processing steps of generating object tracks based on data from cells populated in the occupancy velocity grid for areas of perception from sensed data to provide object track data corresponding with the relevance uncertainty indicators represented for different areas within a perception grid for publishing. In other words, a degree of influence of the different areas by densities of the occupancy grid is determined. The occupancy velocity grid is configured with an adaptive threshold of the occupancy density cells by receiving threshold inputs to adaptively configure the threshold occupancy cell densities to ensure that the uncertainty indicators are effectively incorporated in the occupancy velocity grid. That is, high probability locations use a bottom up physical based clustering and were velocity cluster centers can be associated with object tracks so that regions with high uncertainty can be distinguished from those with low uncertainty. The process includes feedback of prior detected velocity clusters for efficiency. The object tracks resulting from the processing steps are published in object representations for ML models of vehicle perception 855.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. Various changes can be made in the function and arrangement of elements without departing from the scope of the disclosure as set forth in the appended claims and the legal equivalents thereof.

As an example, the apparatus, systems, methods, techniques and articles described herein may be applied to measurement systems other than radar systems (for example Lidar, acoustic or image systems). The apparatus, systems, methods, techniques and articles described herein may be applied to velocity measurement sensors such as laser or light-based velocity measurement sensors.

What is claimed is:

1. A risk maneuver assessment system for planning maneuvers with uncertainties of a vehicle, comprising:
    a controller with a processor programmed to generate a perception of an environment of the vehicle and a behavior decision making model for the vehicle including performing a calculation upon a sensor input to provide, as an output an action risk mapping and at least one target object tracking for different areas within the environment of the vehicle;
    a sensor system configured to provide the sensor input to the processor for providing an area in the environment of the vehicle for filtering target objects;
    one or more modules configured to, by the processor, map and track the target objects to make a candidate detection from multiple candidate detections of a true candidate detection as the tracked target object;
    one or more first modules configured to, by the processor, apply a Markov Random Field (MRF) algorithm for recognizing a current situation of the vehicle in the environment and predict a risk of executing a planned vehicle maneuver at the true detection of the dynamically tracked target;
    one or more second modules configured to, by the processor, apply mapping functions to sensed data of the environment for configuring a machine learning model of decision making behavior of the vehicle;
    one or more third modules configured to, by the processor, apply adaptive threshold to cells of an occupancy grid configured for representing an area of tracking of objects within the vehicle environment;
    the one or more of the second and/or third modules further configured to select as the true detection at least one of the candidate detections that is within a radius for the target, and the candidate detection that is closest to a first known mapped pathway;
    the one or more of the second and/or third modules further configured to select as the true detection, the candidate that indicates a position and velocity that are consistent with a target traveling on a second known travel mapped pathway, and to select as a false detection, the candidate that indicates the position that is outside the second known pathway or the velocity is not consistent with the target traveling; and
    a fourth module configured to compute, by a gating operation, a distance metric from a last position of the tracked target object to a predicted position less than a threshold distance related to one or more of the candidate detections.

2. The system of claim 1, further comprising:
the one or more first modules programmed to generate a Markov Random Field (MRF) to recognize the current situation.

3. The system of claim 1, further comprising:
one or more fifth modules configured to, by the processor, apply the Markov Random Field (MRF) algorithm representing the tracked target object in one or more cells of the occupancy grid by:
    calculating an object measurement density for each tracked target object represented in the one or more cells of the occupancy grid;
    spreading the density over a window comprising a set of cells of the occupancy grid represented by the tracked target object; and
    spreading velocities over the window comprising a same set of cells of the occupancy grid represented by the tracked target object.

4. The system of claim 3, further comprising:
one or more sixth modules configured to, by the processor, apply mapping functions to the sensed data of the environment for configuring the machine learning (ML) model of decision making behavior of the vehicle by an action risk assessment model trained using semi-supervised machine learning techniques by on-line and off-line training for mapping the function to the candidate action to determine with risk factors a learned drivable path.

5. The system of claim 4, further comprising:
a seventh module configured to, by a processor, perform in the off-line training of the ML model comprising:
collecting labels, co-collecting occupancy velocity grids, extracting features from the occupancy grids, and applying at least support vector machine (SVM) techniques for recognizing class patterns of the candidate actions to determine with risk factors the learned drivable path.

6. The system of claim 5, further comprising an eighth module configured to, by the processor, apply the adaptive threshold to cells of the occupancy grid configured for representing the area of tracking of objects within the vehicle environment comprising:
    a ninth module configured to, by the processor, compute by an adaptive threshold occupancy density, the likelihood that the candidate action is available for the target tracked object based on the computed density distribution, and select the candidate action that has a highest probability of being available; and a tenth module configured to, by the processor, compute a clustering for velocity clusters for a set of candidate actions to select the target tracked object that indicates a position that is consistent with the learned drivable path.

7. The system of claim 5, wherein the ML model is trained using reinforcement learning techniques using a data set of past collected labels and sensor data of drivable paths and wherein the eight module is configured to select the candidate action that will likely contribute to one of the drivable paths wherein the sensor data at least comprises one of: radar, acoustic, lidar or image sensor data.

8. A vehicle, comprising:
a sensor detection sensing device including one or more of a set comprising: a radar, acoustic, lidar and image sensing device;
a risk maneuver assessment system for assessing one or more uncertainty factors in planned maneuvers; and a plurality of modules configured to, by a processor, generate a perception of an environment of the vehicle and a output target output for tracking different areas within the environment; the plurality of modules comprising:
one or more modules configured to, by a processor, map and track target objects to make a candidate detection from multiple candidate detections of a true candidate detection as the tracked target object;
one or more modules configured to, by the processor, apply a Markov Random Field (MRF) algorithm for recognizing a current situation of the vehicle in the environment and for predicting a risk of executing a planned vehicle maneuver at the true detection of the dynamically tracked target;
one or more modules configured to, by the processor, apply mapping functions to sensed data of the environment for configuring a machine learning model of decision making behavior of the vehicle;
one or more modules configured to, by the processor, apply adaptive threshold to cells of an occupancy grid configured for representing areas of tracking of objects within the environment;
a controller with a processor configured to generate control commands in accordance with modeling of the decision making behavior and the perception of the environment of the vehicle for planned vehicle maneuvers;
a first module configured to select, as the true detection, the candidate detection that is within a radius for the target;
a second module configured to select, as the true detection, the candidate detection that is closest to a first known mapped pathway;
a third module configured to select the true detection, the candidate that indicates a position and velocity that are consistent with a target traveling on a second known travel mapped pathway, and to select a false detection, the candidate that indicates the position that is outside the second known pathway or the velocity is not consistent with the target traveling; and
a fourth module configured to compute, by a gating operation, a distance metric from the last position of the tracked target object to a predicted position less than a threshold distance related to one or more of the candidate detections.

9. The system of claim 8, wherein the one or more modules are programmed to generate a Markov Random Field (MRF) to recognize the current situation.

10. The system of claim 8, wherein the one or more modules configured by the processor for applying the Markov Random Field (MRF) algorithm representing the tracked target object in one or more cells of the occupancy grid further comprising:
a fifth module is configured to calculate an object measurement density for each tracked target object represented in the one or more cells of the occupancy grid;
a sixth module is configured to spread the density over a window comprising a set of cells of the occupancy grid represented by the tracked target object; and
a seventh module is configured to spread velocities over the window comprising the same set of cells of the occupancy grid represented by the tracked target object.

11. The system of claim 10, wherein the one or more modules configured by the processor for applying mapping functions to the sensed data of the environment for configuring the machine learning (ML) model of decision making behavior of the vehicle further comprising:
an eighth module comprising an action risk assessment model trained using semi-supervised machine learning techniques, by on-line and off-line training, for mapping the function to the candidate action to determine with risk factors a learned drivable path wherein the eight module in the off-line training of the ML model comprises: collecting labels, co-collecting occupancy velocity grids, extracting features from the occupancy grids, and applying at least support vector machine (SVM) techniques for recognizing class patterns of the candidate actions to determine with risk factors the learned drivable path.

12. The system of claim 11, wherein the one or more modules to apply the adaptive threshold to cells of the occupancy grid configured for representing the area of tracking of objects within the vehicle environment comprising:
a ninth module configured to compute by an adaptive threshold occupancy density, the likelihood that the candidate action is available for the target tracked object based on the computed density distribution, and select the candidate action that has a highest probability of being available; and
a tenth module configured to compute a clustering for velocity clusters for a set of candidate actions to select the target tracked object that indicates a position that is consistent with the learned drivable path.

13. The system of claim 12, wherein the ML model is trained using reinforcement learning techniques using a data set of past collected labels and radar data of drivable paths and wherein the eight module is configured to select the candidate action that will likely contribute to one of the drivable paths.

14. A planning system of a vehicle, the system comprising: a sensor system configured to provide a sensor input to a processor for providing an area in an environment of the vehicle for filtering target objects; and
a non-transitory computer readable medium comprising:
a first module configured to, by the processor, select, as a true detection, a candidate detection that is within a radius for the target;
a second module configured to, by the processor, select, as the true detection, the candidate detection that is closest to a first known mapped pathway;

a third module configured to, by the processor, select the true detection, the candidate that indicates a position and velocity that are consistent with a target traveling on a second known travel mapped pathway, and to select a false detection, the candidate that indicates the position that is outside the second known pathway or the velocity is not consistent with the target traveling; and a fourth module configured to, by the processor, compute, by a gating operation, a distance metric from the last position of the tracked target object to a predicted position less than a threshold distance related to one or more of the candidate detections.

* * * * *